3,033,079
FIELD GLASS WITH SHOCK PROTECTION
COVERING
Eugen Haüpt, Aalen, Wuerttemberg, Roland Leinhos, Oberkochen, Wuerttemberg, Werner Rilk and Kurt Schubart, Koenigsbronn, Wuerttemberg, and Kurt Wustemann, Heidenheim (Brenz), Wuerttemberg, Germany, assignors to Carl Zeiss, Heidenheim (Brenz), Wuerttemberg, Germany
Filed Nov. 17, 1959, Ser. No. 853,549
Claims priority, application Germany Nov. 18, 1958
3 Claims. (Cl. 88—34)

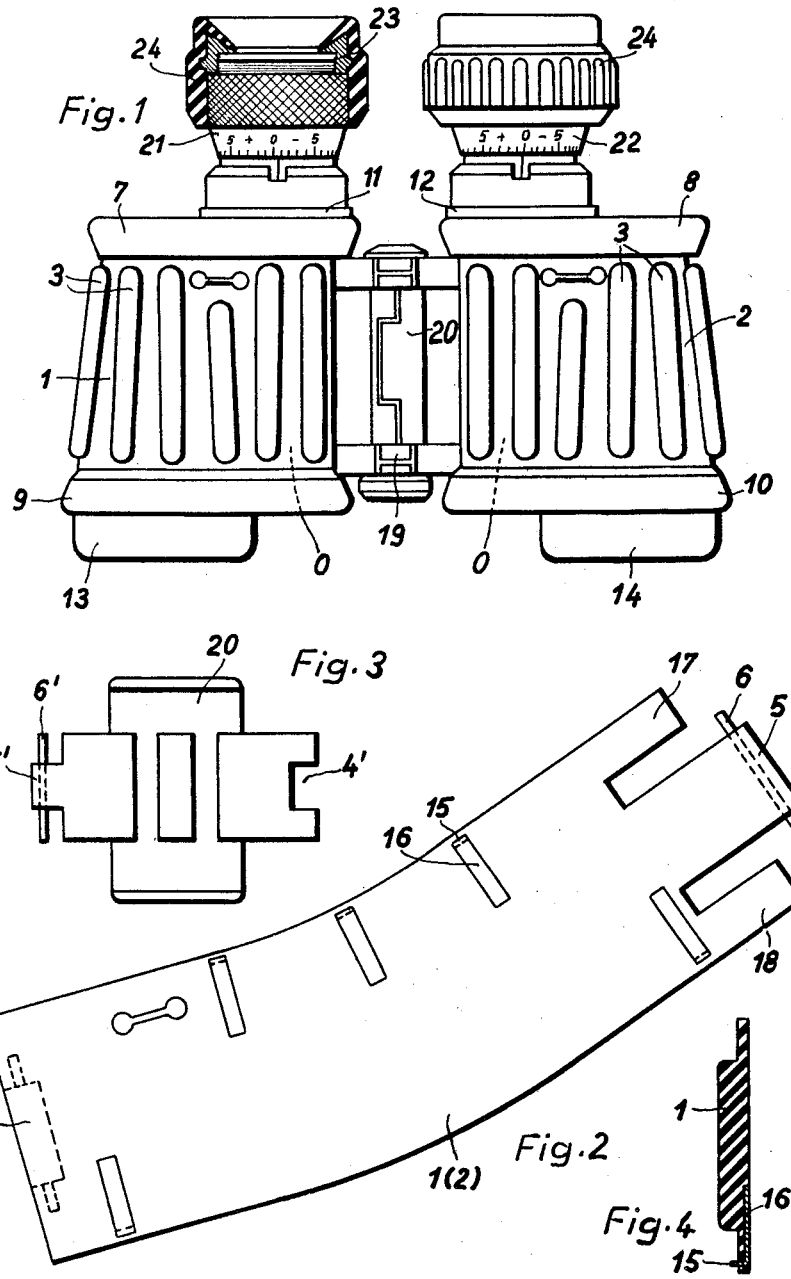

The invention relates to monocular or binocular field glasses which are provided with a covering of soft rubber. It has been proposed heretofore to cover the delicate parts of a field glass, namely the ocular mounts and the objective mounts, with a covering which protects these parts against shock. Even the tubular casing of field glasses has been protected by soft rubber coverings or the like, which are permanently cemented into place.

It is an object of the present invention to provide field glasses with shock protection coverings which do not require to be cemented into place but can be applied and removed at any time by the owner of the field glasses, so that it is not necessary to return a field glass which was purchased without the shock protection covering to the factory if it is desired to provide the field glass with that shock protection.

The covering of the present invention consists of individual elements which are adapted to cover the tubular bodies of the field glass and, if desired, also the parts which form a hinge between the two bodies of a binocular field glass. Each individual element consists of a band which is wrapped around the body and is provided at its ends with interengaging recesses and projections which are connected with each other by a pin or the like. Furthermore, the end faces of the body of the field glass are provided with elastic caps provided with flanges which cover the adjacent marginal portions of the elastic sleeves which cover the circumferential wall of the body. These elastic caps are also provided with integral elastic collars which surround the objective mount and the ocular mounts of the field glass. For the purpose of providing a secure connection between the sleeves and the edges of the caps the flanges of the caps are made of a conical shape, whereby the taper becomes smaller toward the center portion of the body. Furthermore, the marginal portions of the sleeves are provided with outwardly extending projections which engage the flanges of the caps and prevent an inadvertent slidable removal of the same.

Preferably these projections consist of rectangularly bent ends provided on metallic strips which are embedded in the sleeve.

Another object of the invention is to provide the oculars of the field glass with eye cups provided with a sleeve of soft rubber vulcanized upon a metallic ring which may be applied to and readily removed from any eye cups already provided on a field glass.

The invention will now be described in more detail with reference to the accompanying drawings, in which—

FIG. 1 illustrates a binocular field glass viewed from the side which faces the body of the user. The left hand ocular is illustrated in section.

FIG. 2 illustrates the inner surface of an elastic band in its unwound condition and which is employed for the purpose of being wrapped around the body of the field glass.

FIG. 3 illustrates an elastic band adapted to be wrapped around the hinge connection in a binocular field glass, and FIG. 4 illustrates a cross section through the wall of the band shown in FIG. 2.

Referring to FIG. 1, the tubular bodies 0 of the illustrated binocular field glass are provided with elastic sleeves 1 and 2 of soft rubber. The outer surfaces of these sleeves are provided for the purpose of improving the shock protection with thick, lengthwise extending ribs 3. The abutting ends of the sleeves are provided with parts which, when these sleeves are closed, interengage. These parts consist of a recess 4 and a projection 5. The projection 5 is connected by means of a pin 6 with the other end of the sleeve where the projection 5 enters into the recess 4.

The recess 4 is preferably provided in one of the ribs 3 which should be arranged at the outer edge of the bands 1 or 2 so that the rib covers the recess and the strip appears to be whole except that a socket is formed for receiving the projection 5. The elastic band which forms the covering for the hinge may be provided as shown in FIG. 3 with a cut-out 4' in which the tongue 5' enters and is secured in place by means of a pin 6'.

The upper and lower marginal portions of the sleeves 1, 2 which are wrapped around the bodies 0 are covered by the flanges of elastic caps 7, 8, 9 and 10 which latter are provided for the purpose of covering the end walls of the bodies 0. The flanges of these caps are conical and the smaller perimeter of these flanges is directed toward the center portions of the sleeves 1, 2. Furthermore, the caps 7 and 8 are provided with outwardly extending collars 11, 12 respectively, for surrounding the ocular mounts, and the other two caps 9 and 10 are provided with collars 13 and 14 respectively, for covering the objective mounts.

The marginal portions of the sleeves 1, 2 which are covered by the mentioned flanges of the caps are provided with outwardly extending projections 15 which consist of rectangularly bent ends of metallic strips 16 which are vulcanized onto the inner faces of the bands forming the sleeves 1 and 2. These projections 15 prevent effectively an accidental removal of the caps from the sleeves 1, 2. At one end the elastic bands terminate in spaced, parallel rectangular strips 17 and 18 which also come to lie below the flanges of the caps. FIG. 4 illustrates a cross-section of the wall of the sleeve 1 in which metallic strips 16 provided with rectangularly bent ends 15 projecting outwardly through the wall are embedded and vulcanized in place.

The hinge portion 19 which permits an adjustment of the binocular field glass is covered by an elastic sleeve 20 such as is shown in FIG. 3.

For the protection of the oculars 21, 22 the latter are provided with metallic eye cups 23 which have vulcanized thereon a soft rubber sleeve 24.

What we claim is:

1. In a protective covering for a field glass comprising a substantially tubular element with an objective mount at one end thereof and an ocular mount at the other end, an elastic band member wrapped around said tubular element to form a sleeve substantially covering the peripheral surface of said tubular element, means securing the ends of said elastic band member together, a first elastic cap member, a peripheral flange on said first cap member tightly surrounding an end portion of said sleeve, a projecting collar surrounding an opening in said first cap member and fitting snugly around said objective mount, a second elastic cap member, a peripheral flange on said second cap member tightly surrounding the other end portion of said sleeve, a projecting collar surrounding an opening in said second cap member and fitting snugly around said ocular mount, and a plurality of substantially L-shaped metal members spaced peripherally around said sleeve and each having one of its legs firmly embedded in the sleeve material and the other leg projecting outwardly through said sleeve in close proximity of one of the ends of said sleeve, whereby said projecting legs form a plurality of lugs at both ends of the sleeve for biting into the inner surfaces of said flanges of said first and second caps and thereby to retain said first and second caps firmly in position.

2. A protective covering as set forth in claim 1, in which said flanges of said first and second caps increase in thickness from their free edges so as to form shock-absorbing welts around the end portions of said tubular element.

3. A protective covering as set forth in claim 1, in which said sleeve is provided with a plurality of substantially longitudinal shock-absorbing ridges projecting from the outer surface thereof.

References Cited in the file of this patent

UNITED STATES PATENTS

| | | |
|---|---|---|
| 2,271,380 | Strang et al. | Jan. 27, 1942 |
| 2,372,479 | French | Mar. 27, 1945 |
| 2,813,564 | Benz | Nov. 19, 1957 |